UNITED STATES PATENT OFFICE.

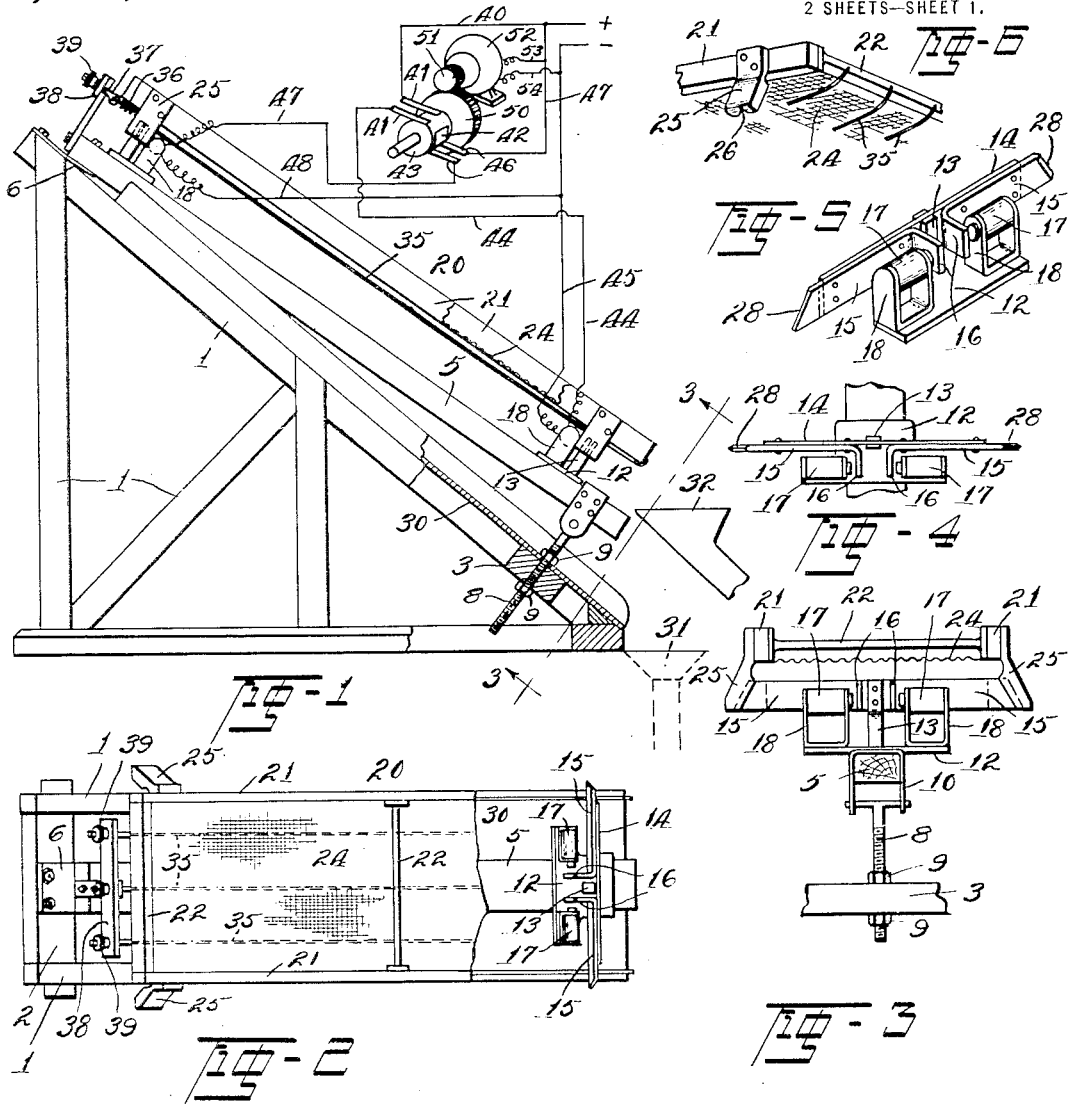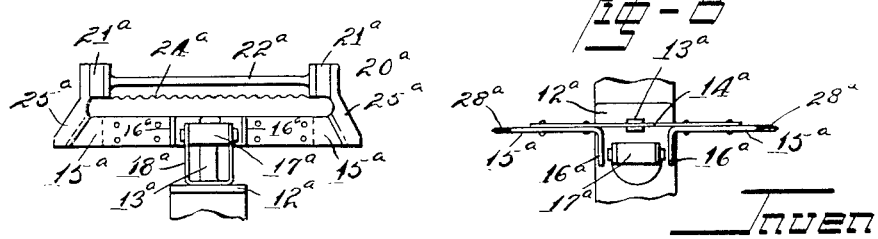

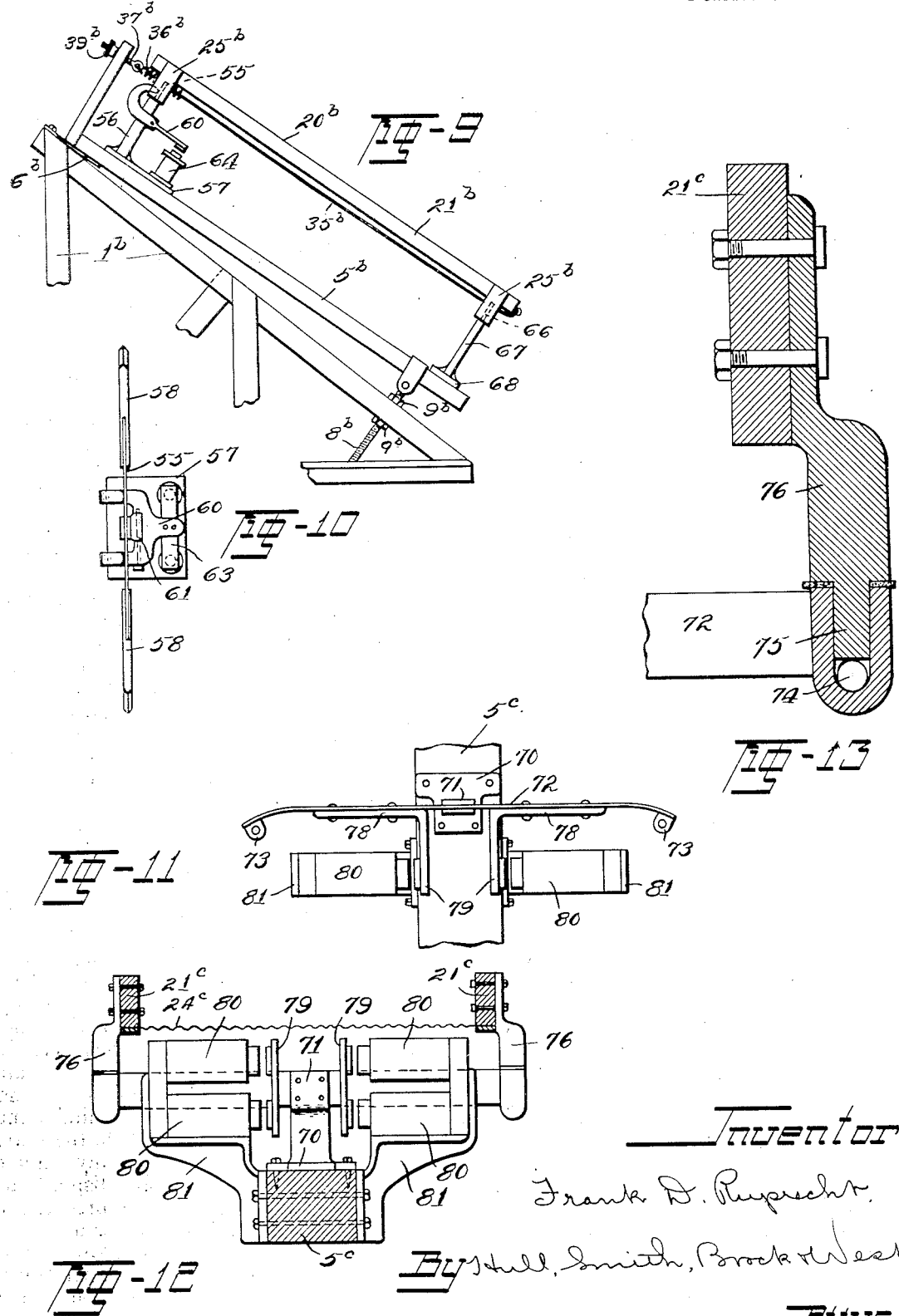

FRANK D. RUPRECHT, OF MIDWAY, FLORIDA.

SCREENING APPARATUS.

1,397,906.  Specification of Letters Patent.  Patented Nov. 22, 1921.

Application filed June 5, 1919. Serial No. 301,961.

*To all whom it may concern:*

Be it known that I, FRANK D. RUPRECHT, a citizen of the United States, residing at Midway, in the county of Gadsden and State of Florida, have invented a certain new and useful Improvement in Screening Apparatus, of which the following is a full, clear, and exact description, reference being had to the accompanying drawings.

The aim of this invention, generally stated, is to provide an efficient, reliable and durable screening apparatus for sifting Fullers' earth, cement, etc., or in fact any material that requires screening, in an expeditious and satisfactory manner, and the operation of which is not affected by the presence of dust and grit.

More specific objects attained through the pursuance of my invention in any of its various forms illustrated in the accompanying drawings are: ease of action of the screen; simplicity of construction of the screen supporting means and their practical immunity from wear; positiveness of operation of the vibrating means; and freedom of the screen from clogging.

The last mentioned object is realized through the employment of flexible elements stretched beneath the screen which are slackened when the screen moves in one direction and are jerked taut when it moves in the opposite direction, thereby to impart a quick blow to the screen surface and vibrate it in a direction at right angles to the plane of the screen so that any particle caught within the meshes of the screen are effectually dislodged.

Objects in addition to those above enumerated will become apparent as this description proceeds, and with these several objects in view, the invention may be defined as consisting of the combinations of elements set forth in the claims annexed hereto and illustrated in the accompanying drawings to which reference is now made.

Figure 1 is a side elevation, and Fig. 2 a plan view of my improved screening apparatus, parts being broken away in each view to reveal certain structural details, the former figure including a diagram of the electric circuits involved; Fig. 3 is a fragmentary end elevation of the apparatus as viewed from line 3—3 of Fig. 1; Fig. 4 is a plan view of the supporting and vibrating means situated adjacent one end of the screen shown in Figs. 1 and 2; Fig. 5 is a perspective view of the means shown in plan in Fig. 4; Fig. 6 is a fragmentary perspective view of the screen showing one of the bearing elements which is adapted to rest upon the bearing portion of the supporting means of Fig. 5; Figs. 7 and 8 are views similar to Figs. 3 and 4, of a modification of the supporting and vibrating means; Fig. 9 is a side elevational view of a screening apparatus incorporating a further modification of the supporting and vibrating means, and Fig. 10 shows such modification in plan; Fig. 11 is a plan view of another modification of the screen supporting and vibrating means; Fig. 12 is a transverse section through a screening apparatus involving the modification of Fig. 11; and Fig. 13 is a sectional detail through the connection between one of the bearing elements of the screen and the coöperating part of the supporting means involved in the last modification.

While I shall now proceed to describe in detail and by the use of reference characters the constructions illustrated in the accompanying drawings, I wish to be understood as not limiting myself to the structural details thereof further than is required by the terms of the accompanying claims.

In the drawings, 1 is a supporting structure which may be of any approved form, the same involving cross members 2 and 3 situated, respectively, at its upper and lower ends. A beam 5 is hingedly connected, through a strap 6 of flexible material, such as steel, to the upper cross member 2 of the supporting structure; and the lower end of the beam is adapted to be spaced and supported from the lower cross member 3 by means of a T-headed bolt 8 which passes freely through a hole in said member 3 and is adapted to be held in any adjusted position in the hole by nuts 9 that are arranged to be engaged with the upper and underneath surfaces of the cross member. The ends of the T-head of bolt 8 occupy apertures in a yoke 10 which embraces beam 5 and is secured thereto in any suitable manner. Thus by adjusting bolt 8, the beam 5 may be swung to and held at any angle desired for altering the angular disposition of the screen which, as I shall presently explain, is supported from the beam.

Situated near the upper and lower ends of beam 5 are identical screen supporting and vibrating means, the one reversed with respect to the other, as is apparent from Fig.

1. Each of these means consists of a base 12 having a standard 13 to which is attached a transversely disposed spring 14. L-shaped plates 15 are secured to the opposite end portions of the spring, and the inner ends of the plates are arranged parallel to each other and constitute armatures 16 of electromagnets 17 that are supported in operative relation to the armatures by frames 18 that rise from base 12. It will be readily understood that upon the simultaneous energization of the opposed magnets 17 to attract their armatures 16, the ends of the plates 15 opposite the armatures will be swung in a direction away from the magnets, the spring 14 flexing in the meantime to permit of such action. As soon as the magnets are deënergized, the spring will react to throw the plates 15 in the opposite direction so that a to-and-fro movement of the outer ends of the plates 15 will result from intermittently energizing the magnets.

The screen, which is designated generally by the numeral 20, consists of a frame made up of side members 21 and cross braces 22, and to the underneath surface of this frame is applied the screen proper, designated 24. To each end of each of the side members 21 is applied a bearing element 25 which is inclined downwardly and outwardly from the screen and the inner inclined face of which is provided with a V-shaped groove 26 adapted to receive what I may term, by reason of its nature, the "knife edge" bearing portion 28 of the corresponding plate 15. This construction provides a very simple, durable, and free acting connection between the screen and supporting means, and from the foregoing description it will be readily seen that when the plates 15 are swung or vibrated by the intermittent energization of the magnets 17, the screen 20 will be reciprocated in short strokes according to the extent of swing of the plates 15 and with a frequency corresponding to that of the impulses of current directed through the magnets 17.

With the screen vibrating as explained, material to be sifted may be precipitated through suitable means (not shown) onto the upper end of the screen and as it cascades down the inclined surface of the screen, the finer particles will pass through the screen and fall upon an inclined trough 30, that is shown as supported by the structure 1, and be conducted thereby to a suitable receiver, such being indicated at 31 in Fig. 1. The "tailings", or particles too large to pass through the meshes of the screen, will be discharged from the lower end of the screen into a hopper 32 or other suitable receptacle. In such an operation of the screen a certain amount of the material becomes caught within its meshes, and this would greatly impair the efficiency of the screen were means not employed for dislodging the particles and clearing the screen of them. Logically, this means should agitate the screen in a direction at right angles to its normal movement, and to accomplish this end I extend a series of flexible elements or cords 35 lengthwise beneath the screen, attaching their lower ends to the screen frame, as indicated in Figs. 1 and 6, and their upper ends through springs 36, to eye bolts 37 which pass through a bar 38 shown as carried by the upper end of beam 5, and beyond which bar I apply nuts 39 to the protruding ends of the bolt for the obvious purpose of adjusting the tension of the springs and cords. The springs 36 compensate for any variations in the length of the cords 35 due to changes in atmospheric conditions, and absorb the shock that would otherwise be imparted to the cords when they are jerked taut and thus prevent their breaking. When the screen 20 moves upwardly, the cords 35 are slackened, and when it swings to its lower position the cords are jerked more or less violently with the result that they are lashed against the under surface of the screen, agitating it in the manner already explained and dislodging the particles which have become caught within its meshes.

While it is obvious that a to-and-fro movement of the screen would result from the use of only one set of intermittently energized electro-magnets situated at one end of the structure and serving to positively move the screen in one direction only, allowing the weight of the screen to swing it in the opposite direction, it may be found advantageous in some instances to employ two reversely disposed vibrating means, as illustrated in Fig. 1, so as to make the movement of the screen positive in both directions. Under this duo arrangement an interrupter is included in the circuits to the magnets of the two sets which acts to alternately energize them. Referring to the diagram of Fig. 1, current is directed from what I have indicated as the positive side of the circuit through a conductor 40, brushes 41 (when bridged by contact plate 42 on a drum 43), conductor 44, the magnets of the lower set, and conductor 45 to the negative side of the circuit. Intermediary its times of contact with brushes 41, plate 42 bridges brushes 46 contained within a line 47 from the positive side of the circuit to the magnets of the upper set, the current returning to the negative side of the circuit through conductor 48. As a matter of illustration, I have shown drum 43 as driven through gears 50 and 51 from a motor 52 having its terminals connected to the positive and negative sides of the circuit through the respective wires 53 and 54. As the motor drives the drum 43, first one and then the other of the sets of magnets will be energized to positively move screen 20 alternately in opposite directions.

In the modification of Figs. 7 and 8, a single magnet 17ª is shown as substituted for the two magnets of the previous form, and the same is supported within a U-frame 18ª from the base 12ª. When the magnet 17ª is engergized, the armatures 16ª which constitutes parts of plates 15ª are moved inward to reflect the spring 14ª and swing the screen 20ª, as the same was swung in the former modification when magnets 17 were energized.

In Figs. 9 and 10, the parts of the general structure corresponding to those of the structure revealed in Figs. 1 to 6 are designated by the same reference numerals augmented by the exponent b. In the present form of supporting and vibrating means, a spring 55 is supported within the upper end of a standard 56 which rises from a base 57 applied to beam 5ᵇ near its upper end, and bearing members 58 having their outer ends formed similar to the outer end of the former plates 15, are arranged for coöperation with the bearing element 25ᵇ of the screen 20ᵇ. A Y-shaped lever 60 is pivoted to a boss 61 of standard 56, and the branches of the lever pass beneath spring 55 and then upwardly and backwardly to engage the side of the spring opposite that whereon the lever is pivoted. The stem of the lever has an armature bar 63 attached to it which overhangs electro-magnet 64 supported by base 57. As these magnets are energized to attract the armature bar 63, the lever 60 is rocked to deflect spring 55 and move the screen in one direction and the relaxation of the spring, due to the deënergization of the magnets, permits the screen to swing in the opposite direction. The lower end of the screen is shown as supported in substantially the same manner as its upper end by a spring 66 supported in a standard 67 which rises from a base 68 that is applied to the lower end of beam 5ᵇ. Vibrating means is not shown as used in connection with this supporting means, although it is obvious that such might be done, and that it might be reversed to the upper end so that the same effect would be realized here as that accomplished through the arrangement illustrated in Fig. 1.

In the form of my supporting and vibrating means illustrated in Figs. 11 to 13, the base 70 of a standard 71 is applied to beam 5ᶜ, and a spring 72 is supported in a transverse position by the standard. In this case, the ends of the spring 72 extend out beneath the sides of the spring frame where socket members 73 are applied to them. As illustrated in detail in Fig. 13, a ball 74 occupies the bottom of each socket and receives the downward thrust of a gudgeon 75 which projects from the lower end of the bearing element 76 that is connected to the side of the spring frame. Plates 78 are secured to the side of spring 72 and their adjacent ends are turned laterally into parallel relation to each other to provide armatures 79 for electro-magnet 80 that are supported in brackets 81 from the opposite sides of beam 5ᶜ. Here it will be seen that when the magnets are energized they will attract their respective armatures and deflect the spring 72 to swing the screen in one direction, and when the magnets are deënergized, the reaction of the spring will move the screen in the opposite direction. The present modification is distinguished from the ones preceding it by the curved formation of the spring 72 and its pivotal connections with the screen. The curved portions adjacent the outer ends of this spring lengthen and shorten very slightly as the screen reciprocates to compensate for the variations in distance between the fixed support of the spring and its outer ends that are confined to parallel courses.

Having thus described my invention, what I claim is:—

1. In apparatus of the character set forth, the combination of a supporting structure, a screen, springs disposed transversely of the screen and sustained in spaced relation to each other by the supporting structure, bearing elements through which the screen is supported from the springs, and means for deflecting first one spring and then the other in opposite directions to positively move the screen both to and fro.

2. In apparatus of the character set forth, the combination of a supporting structure, a screen, a spring disposed transversely of the screen and sustained adjacent the center thereof by the supporting structure, bearing elements disposed on opposite sides of the screen and through which the screen is supported from the ends of the spring, electromagnetic means for deflecting the ends of the spring, a circuit including said means, and means for periodically closing the circuit to intermittently energize the electromagnetic means.

3. In apparatus of the character set forth, the combination of a supporting structure, a screen, bearing elements carried by the screen, a spring disposed transversely of the screen and sustained by the supporting structure, a member applied to each end of the spring one part whereof is designed for coöperation with one of the bearing elements and another part of which constitutes an armature, an electromagnet disposed in operative relation to the latter part of said member, a circuit including the electromagnet, and means for periodically closing the circuit thereby to intermittently energize the electromagnet.

4. In apparatus of the character set forth, the combination of a supporting structure, a screen, a spring disposed transversely of said screen and sustained by the supporting structure, bearing elements carried by the opposite sides of the screen, an L-shaped member applied to each end of the spring the outer end whereof is designed for coöperation with the bearing element occurring on the corresponding side of the screen, an electromagnet disposed in operative relation to the laterally turned part of each member, a circuit including the electromagnet, and means for periodically closing the circuit thereby to intermittently energize the magnet.

5. In apparatus of the character set forth, the combination of a supporting structure, a screen, bearing elements carried by opposite sides of the screen, a spring disposed transversely of the screen and sustained by the supporting structure, an L-shaped member applied to each end of the spring the outer end whereof is designed for coöperation with the bearing element occurring on the corresponding side of the screen, the lateral branches of the L-shaped members being substantially parallel to and spaced from each other, and an electromagnet disposed between the lateral branches of said members, a circuit including the electromagnets, and means for periodically closing the circuit thereby to intermittently energize the electromagnets.

6. In apparatus of the character set forth, the combination of a supporting structure, a screen, a curved spring disposed transversely of the screen and sustained by the supporting structure, pivotal connections between the outer ends of the spring and the screen, and means for moving the screen to and fro.

7. In apparatus of the character set forth, the combination of a supporting structure, a screen, a curved spring disposed transversely of the screen and sustained by the supporting structure, upwardly opening socket members carried by the ends of the spring, bearing elements attached to the opposite sides of the screen and having parts occupying the socket, and means for moving the screen to and fro.

8. In apparatus of the character set forth, the combination of a supporting structure, a screen, a curved spring disposed transversely of and beneath the screen and sustained by the supporting structure, upwardly opening socket members carried by the ends of the spring, bearing elements attached to the opposite sides of the screen and having parts occupying the socket, means for moving the screen to and fro, ball bearings within the bottoms of the sockets whereon the aforesaid parts rest, and packing elements between the bearing elements and members.

9. In apparatus of the character set forth, the combination of a supporting structure, a screen, a standard sustained by the supporting structure beneath the screen, a spring disposed transversely of the screen and supported by the standard, a forked lever pivoted to the standard the branches whereof bear upon one side of the spring on opposite sides of the standard, an electromagnet disposed in operative relation to the stem of said lever, a circuit including the electromagnet, and means for periodically closing the circuit thereby to intermittently energize the electromagnet.

10. In apparatus of the character set forth, the combination of a supporting structure, a screen, a spring disposed transversely of the screen and sustained by the structure, a lever pivotally supported by the structure and one end whereof bears upon one side of the spring, an electromagnet disposed in operative relation to the stem of said lever, a circuit including the electromagnet, and means for periodically closing the circuit thereby to intermittently energize the electromagnet.

In testimony whereof, I hereunto affix my signature.

FRANK D. RUPRECHT.